United States Patent [19]
Youmans

[11] 4,379,217
[45] Apr. 5, 1983

[54] METHOD AND MEANS OF MELTING FROZEN MATERIAL ON TERRAIN OR WATER SURFACES

[76] Inventor: Grace A. Youmans, 1816 - 80th St., Des Moines, Iowa 50322

[21] Appl. No.: 231,734

[22] Filed: Feb. 5, 1981

[51] Int. Cl.³ .............................................. B23K 27/00
[52] U.S. Cl. .......................... 219/121 L; 219/121 LM; 219/121 LS; 219/121 LU; 244/17.11
[58] Field of Search ..... 219/121 L, 121 LM, 121 LE, 219/121 LF, 121 LS, 121 LU, 201, 202, 213, 219/220; 47/1.43, DIG. 6; 37/195; 244/17.11, 1 R

[56] References Cited

U.S. PATENT DOCUMENTS

| | | | |
|---|---|---|---|
| 3,652,844 | 3/1972 | Scott, Jr. | 47/1.43 |
| 3,964,183 | 6/1976 | Movat | 37/195 X |
| 4,063,063 | 12/1977 | Funck et al. | 219/121 LS |
| 4,088,865 | 5/1978 | Peters et al. | 219/121 LU X |
| 4,247,281 | 1/1981 | McGrew et al. | 244/17.11 X |

FOREIGN PATENT DOCUMENTS 1119948  7/1968  United Kingdom ........... 47/DIG. 6

*Primary Examiner*—C. L. Albritton
*Attorney, Agent, or Firm*—Zarley, McKee, Thomte, Voorhees & Sease

[57] ABSTRACT

A heat ray emitting means, preferably a laser beam transmitter, is mounted on the undercarriage of a helicopter. The heat ray emitting means is mounted on a turret on the undercarriage of the helicopter and is adapted to be rotated about a nonvertical axis for projection on a frozen surface below while the helicopter is in a substantially hovering condition. Actuation of the heat ray emitting means transmits heat to the frozen surface to melt the same.

9 Claims, 2 Drawing Figures

METHOD AND MEANS OF MELTING FROZEN MATERIAL ON TERRAIN OR WATER SURFACES

BACKGROUND OF THE INVENTION

Snow and ice removal is a problem on highways, canals and rivers, airport runways, and even in open waterways such as lakes and oceans insofar as vessels travelling therein are concerned. Various means have been devised to combat the ice and frozen snow that are present in the aforementioned environments. Land or water vehicles have been equipped with heat ray emission devices, including laser ray beam guns, to effect the melting of the frozen material. Typical of these devices are the units disclosed in British Pat. No. 1,119,948, published July 17, 1968. These devices lack the maneurverability and the speed to effectively melt the frozen material on land and waterways.

BRIEF SUMMARY OF THE INVENTION

This invention combines a heat ray emitting means, preferably a laser beam transmitter, with a conventional helicopter whereby the heat rays may be emitted from the helicopter hovering in mid-air to melt the frozen material on the terrain below the helicopter. The heat ray emitting means can be comprised of one or more emitters which are mounted so as to emit one or more beams on a nonvertical axis. Rotation of the emitter means permits a substantial area of the surface below the helicopter to come in contact with the beams.

A principal object of this invention is to provide an ice and snow melting method and means which is highly maneuverable and which has great speed of operation.

These and other objects will be apparent to those skilled in the art.

DESCRIPTION OF THE PREFERRED EMBODIMENT

Figure 1:
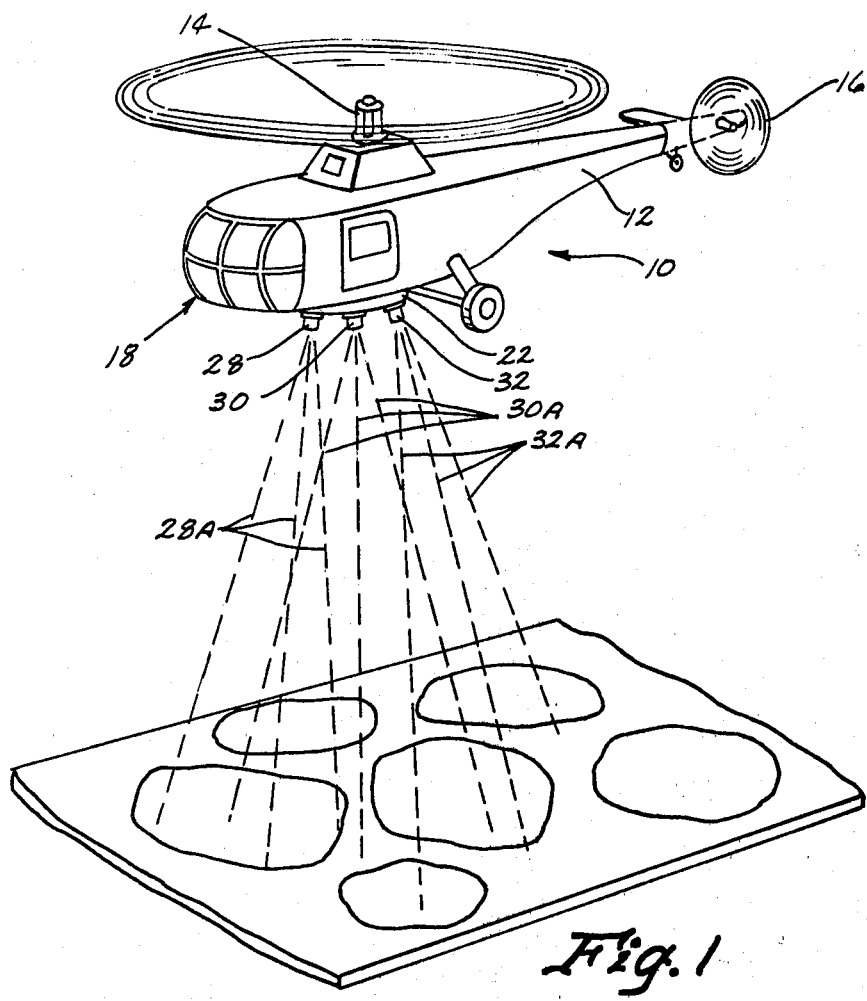
FIG. 1 is a perspective view of a helicopter utilizing a turret with several heat ray emitting means thereon, and illustrating how the beams can be focused on a surface below the hovering helicopter to effect the melting of the frozen material.
Figure 2:
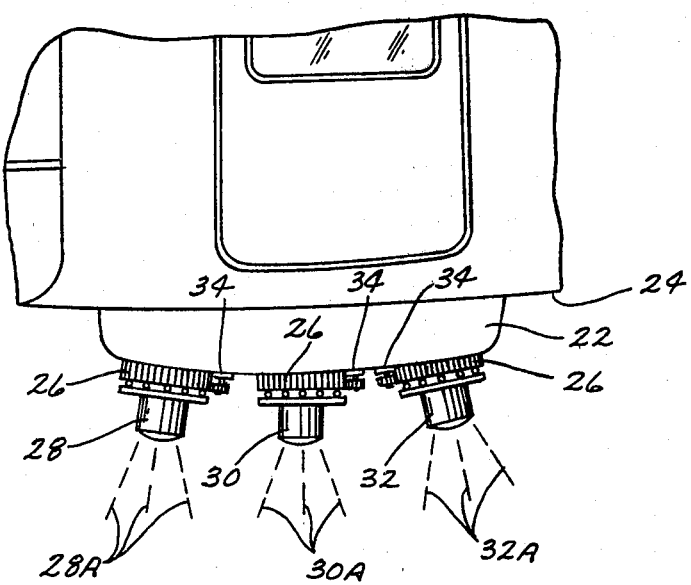
FIG. 2 is a partial elevational view at an enlarged scale of the turret shown in FIG. 1.

The numeral 10 generally designates a conventional helicopter having a body or chassis 12, a horizontal rotor means 14; a vertical rotor means 16; a control compartment 18; and a wheel assembly 20.

A turret 22 is secured to the undercarriage 24 of the helicopter. A plurality of gears 26 are rotatably mounted on a suitable shaft (not shown) to turret 22. The longitudinal axes of the shafts and the longitudinal axis passing through the center of the gears 26 are inclined with respect to a vertical position.

A plurality of heat ray emitting devices 28, 30 and 32 are mounted on the shafts of gears 26 and are adapted to rotate with the gears. Drive gears 34 are in mesh with gears 36 and are adapted to rotate the gears 26 as well as the heat ray emitting devices 28, 30 and 32.

The heat ray emitting devices 28, 30 and 32 are of conventional design and are preferably of the same type of typical laser ray beam gun construction disclosed in the previously mentioned British Pat. No. 1,119,948. The devices 28, 30 and 32 can emit either a single or a plurality of beams generally designated by the numerals 28A, 30A and 32A.

When it is desired to melt frozen material on a given surface, the helicopter becomes airborne in conventional manner, and then hovers over the area to be treated. The heat ray emitting devices 28, 30 and 32 are actuated in conventional manner to direct the beams 28A, 30A and 32A to the surface below as generally depicted in FIG. 1. The melting process is quickened by causing a conventional power source (not shown) to rotate the gears 34 to cause the rotation of gears 36 and each of the devices 28, 30 and 32. The helicopter normally would hover over the area until the melting of the frozen material directly below the helicopter was effected. The helicopter would then slowly be moved along the desired route of travel to continue the melting function.

From the foregoing, it is seen that this invention provides both a method and means of melting frozen material on either land or water bodies which is highly maneuverable and which rapidly achieves the thawing or melting function as compared to conventional apparatus and methods. Accordingly, this invention will achieve its stated objectives.

I claim:

1. The combination of an airborne helicopter and an ice and snow melting device, comprising,
   a helicopter device having the capability of hovering in midair and the ability to move both laterally and vertically,
   said helicopter having a chassis with an undercarriage means,
   a downwardly extending turret on said undercarriage,
   a rotatable heat ray emitting means on said turret for emitting heat rays downwardly from said helicopter to melt ice and snow on the terrain below said helicopter.

2. The combination of claim 1 wherein said heat ray emitting means is a laser beam transmitter.

3. The combination of claim 1 wherein a plurality of heat ray emitting means are mounted on said turret.

4. The combination of claim 3 wherein said heat ray emitting means are laser beam transmitters.

5. The method of melting ice and snow material on terrain or water surfaces, comprising,
   positioning a heat ray emitting means on a helicopter device capable of hovering in midair and capable of flight in vertical and horizontal directions,
   hovering said helicopter in an airborne condition over the material to be melted,
   actuating said heat ray emitting means to direct heat rays rotatably about a nonverticle axis on said material to cause said material to melt.

6. The method of claim 5 wherein said heat ray emitting means is a laser beam transmitter.

7. The method of claim 5 wherein a plurality of heat ray emitting means are positioned on said helicopter and are actuated simultaneously to direct heat rays on said material.

8. The combination of claim 1 wherein said turret has rotating means for rotating said heat ray emitting means about a longitudinal axis that is normally at an angle with respect to a vertical axis.

9. The combination of claim 3 wherein said turret has rotating means for rotating said heat ray emitting means about a longitudinal axis that is normally at an angle with respect to a vertical axis.

* * * * *